(12) United States Patent
Jeon et al.

(10) Patent No.: US 12,166,211 B2
(45) Date of Patent: Dec. 10, 2024

(54) POROUS ELECTRODE INCLUDING CATALYST FILM HAVING SUB-MICRON-SIZED INTERCONNECTED PORE NETWORKS, METHOD FOR MANUFACTURING THE SAME AND METAL-AIR BATTERY INCLUDING THE SAME

(71) Applicants: Korea Advanced Institute of Science and Technology, Daejeon (KR); Korea University Research and Business Foundation, Seoul (KR); Daegu Gyeongbuk Institute of Science and Technology, Daegu (KR)

(72) Inventors: Seokwoo Jeon, Daejeon (KR); Gayea Hyun, Daejeon (KR); Yong-Mook Kang, Seoul (KR); Mihui Park, Seoul (KR); Seonyong Jo, Seoul (KR); Yong Min Lee, Daegu (KR); Joonam Park, Daegu (KR); Seungwon Jung, Daegu (KR)

( * ) Notice: Subject to any disclaimer, the term of this patent is extended or adjusted under 35 U.S.C. 154(b) by 420 days.

(21) Appl. No.: 17/541,227

(22) Filed: Dec. 2, 2021

(65) Prior Publication Data

US 2022/0181634 A1    Jun. 9, 2022

(30) Foreign Application Priority Data

Dec. 3, 2020 (KR) .................. 10-2020-0167454

(51) Int. Cl.
*H01M 4/66* (2006.01)
*H01M 4/04* (2006.01)
*H01M 4/62* (2006.01)
*H01M 10/052* (2010.01)

(52) U.S. Cl.
CPC ......... *H01M 4/623* (2013.01); *H01M 4/0471* (2013.01); *H01M 4/661* (2013.01); *H01M 4/663* (2013.01); *H01M 4/667* (2013.01); *H01M 10/052* (2013.01)

(58) Field of Classification Search
None
See application file for complete search history.

(56) References Cited

U.S. PATENT DOCUMENTS

2013/0017453 A1* 1/2013 Ajayan ............... H01M 4/1391
205/66

FOREIGN PATENT DOCUMENTS

KR    10-2112029    5/2020

OTHER PUBLICATIONS

English Specification of 10-2112029, May 19, 2020.
Hee-Dae Lim et al., "Enhanced Power and Rechargeability of a Li—O2 Battery Based on a Hierarchical-Fibril CNT Electrode," Adv. Mater. 2013, 25, 1348?1352.

* cited by examiner

*Primary Examiner* — Tracy M Dove
(74) *Attorney, Agent, or Firm* — ANTONIO HA & U.S. PATENT, LLC

(57) ABSTRACT

According to an embodiment, a porous electrode comprises a three-dimensional nanostructured porous catalyst film including a catalyst material promoting an oxygen reduction and evolution reactions, having an aligned pore structure, and having an upper surface and a lower surface opening the pore structure and a porous current collecting layer interfacially adhered to the three-dimensional nanostructured porous catalyst film by a binder polymer.

15 Claims, 18 Drawing Sheets

POROUS ELECTRODE INCLUDING CATALYST FILM HAVING SUB-MICRON-SIZED INTERCONNECTED PORE NETWORKS, METHOD FOR MANUFACTURING THE SAME AND METAL-AIR BATTERY INCLUDING THE SAME

CROSS-REFERENCE TO RELATED APPLICATION(S)

This application is based on and claims priority under 35 U.S.C. 119 to Korean Patent Application No. 10-2020-0167454, filed on Dec. 3, 2020, in the Korean Intellectual Property Office, the disclosure of which is herein incorporated by reference in its entirety.

TECHNICAL FIELD

The disclosure relates to electrodes for batteries. More particularly, the disclosure relates to a porous electrode having a catalyst film including a submicron-sized interconnected pore network, a method for manufacturing the same, and a metal-air battery including the same.

DESCRIPTION OF RELATED ART

The lithium-air battery in which lithium and oxygen in the air are combined has an advantage in that the energy storage density per weight is superior to that of the lithium ion battery but still has several limitations in use as a secondary battery.

In particular, since solid lithium oxide ($Li_2O_2$) generated during discharge is not reversibly decomposed during charge, the lithium-air battery is difficult to commercialize due to reduced efficiency and lifespan by lithium oxide ($Li_2O_2$).

To address these issues, studies are being conducted to enhance the reaction kinetics for the generation and decomposition of lithium oxide through the nanostructure of the air electrode.

Solid lithium oxide, a discharge product, gradually accumulates on the electrode surface as a continuous discharging, blocking the pore network of the air electrode, inducing electrical disconnection due to its insulating properties, and requires huge overpotential on the reverse charging, hence reducing the reaction efficiency and lifespan of the battery.

There are some prior studies claiming that the performance of the air electrode may be dramatically enhanced by controlling the production/accumulation manner of lithium oxide by controlling the morphology and porosity of the air electrode.

From three-dimensional air electrodes prepared through alignment of polystyrene (PS) or air electrodes using stacking, in lattice form, of carbon nanotubes (CNT), it may be shown that interconnectivity and alignment in a specific pore size range affects the performance of the air electrode.

However, three-dimensional (3D) nanostructure manufacturing methods through stacking of the low-dimensional nanomaterials suffer from long process time, poor scalability, and poor process reliability. 3D nanomaterial manufacturing methods using 3D printing require a low process resolution and long process time.

Further, nanostructures including nanometer- to submicron-size pores required for metal-air batteries are mainly manufactured in the form of a thin film and therefore suffer from somewhat low mechanical stability and thus are difficult to apply to air electrodes.

SUMMARY

According to an embodiment of the disclosure, there is provided a porous electrode including a catalyst material and having enhanced mass transfer and electron transfer.

According to an embodiment of the disclosure, there is provided a method for manufacturing the porous electrode.

According to an embodiment of the disclosure, there is provided a metal-air battery including the porous electrode.

The disclosure is not limited to the foregoing embodiments but various modifications or changes may rather be made thereto without departing from the spirit and scope of the disclosure.

According to an embodiment, a porous electrode comprises a three-dimensional nanostructured porous catalyst film including a catalyst material promoting an oxygen reduction and evolution reactions, having an aligned pore structure, and having an upper surface and a lower surface opening the pore structure and a porous current collecting layer interfacially adhered to the three-dimensional nanostructured porous catalyst film by a binder polymer.

The catalyst material may include at least one selected from the group consisting of copper, nickel, manganese, cobalt, palladium, platinum, and a transition metal oxide.

The binder polymer may include a fluorine-based polymer.

The binder polymer may include at least one selected from the group consisting of Nafion, PVDF-HFP (polyvinylidene fluoride-hexafluoropropylene), and PTFE (polytetrafluoroethylene).

The porous current collecting layer may include carbon paper including at least one of a carbon wire, a carbon plate, and carbon particles.

The porous current collecting layer may include at least one selected from the group consisting of a metal mesh and a metal foam.

According to an embodiment, a metal-air battery comprises a positive electrode including a porous electrode, a negative electrode spaced apart from the positive electrode and including lithium, a separator disposed between the positive electrode and the negative electrode, and an electrolyte for transferring ions between the positive electrode and the negative electrode.

According to an embodiment, a method for manufacturing a porous electrode comprises forming a three-dimensional porous template on a substrate including a conductive layer, filling the three-dimensional porous template through electroplating, removing the three-dimensional porous template to form an inverted-shape three-dimensional nanostructured porous film, removing the conductive layer to separate the substrate and the three-dimensional nanostructured porous film, bringing a porous current collecting layer and the three-dimensional nanostructured porous film in contact with each other, dropping a binder solution including a binder polymer on the three-dimensional nanostructured porous film, and drying the binder solution to attach the porous current collecting layer and the three-dimensional nanostructured porous film. The three-dimensional nanostructured porous film may include a catalyst material promoting an oxygen reduction and evolution reactions.

The binder polymer may include a fluorine-based polymer.

A content of the binder polymer may be 0.1 wt. % to 5 wt. %.

The binder polymer may include at least one selected from the group consisting of Nafion, PVDF-HFP (polyvinylidene fluoride-hexafluoropropylene), and PTFE (polytetrafluoroethylene).

The porous current collecting layer may include carbon paper.

The carbon paper may include at least one of a carbon wire, a carbon plate, and carbon particles.

The porous current collecting layer may include at least one selected from the group consisting of a metal mesh and a metal foam.

The method may further comprise performing electropolishing to activate a surface of the three-dimensional nanostructured porous film, before separating the three-dimensional nanostructured porous film from the substrate.

The method may further comprise immersing the three-dimensional nanostructured porous film combined with the substrate in hydrofluoric acid to separate the three-dimensional nanostructured porous film from the substrate and activate the surface of the three-dimensional nanostructured porous film.

According to various embodiments of the disclosure, the three-dimensional nanostructured porous electrode provides efficient movement of electrons between the porous current collecting layer and the three-dimensional nanostructured catalyst film when the air electrode is driven.

Accordingly, the efficiency of the metal-air battery may be enhanced.

Conventional nanostructured films are difficult to use as air electrodes due to their insufficient mechanical properties due to their thin thickness. However, according to various embodiments of the disclosure, it is possible to sufficiently serve as a current collector through bonding with a porous current collecting layer.

Further, in the case of a catalyst composed of a low-dimensional nanostructure, a conductive additive and a binder were mixed and applied, on the porous current collecting layer, in the form of a slurry. However, in a method according to an embodiment of the disclosure, a diluted binder is sprayed on the upper portion of a stack of the three-dimensional porous film and the porous current collecting layer and dried. Thus, embodiments of the disclosure may have various applications in other various film-type materials and allow for effective use of structural advantageous of a nanostructured electrolyte film.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Hereinafter, a porous electrode having a catalyst film including a submicron-sized interconnected pore network, a method for manufacturing the same, and a metal-air battery including the same are described in detail with reference to the accompanying drawings.

Various changes may be made to the disclosure, and the disclosure may come with a diversity of embodiments. Some embodiments of the disclosure are shown and described in connection with the drawings.

However, it should be appreciated that the disclosure is not limited to the embodiments, and all changes and/or equivalents or replacements thereto also belong to the scope of the disclosure.

In the accompanying drawings, the dimensions of the structures may be enlarged or exaggerated for clarity of the disclosure.

The terms as used herein are provided merely to describe some embodiments thereof, but not to limit the disclosure.

As used herein, the singular forms "a," "an," and "the" are intended to include the plural forms as well, unless the context clearly indicates otherwise.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
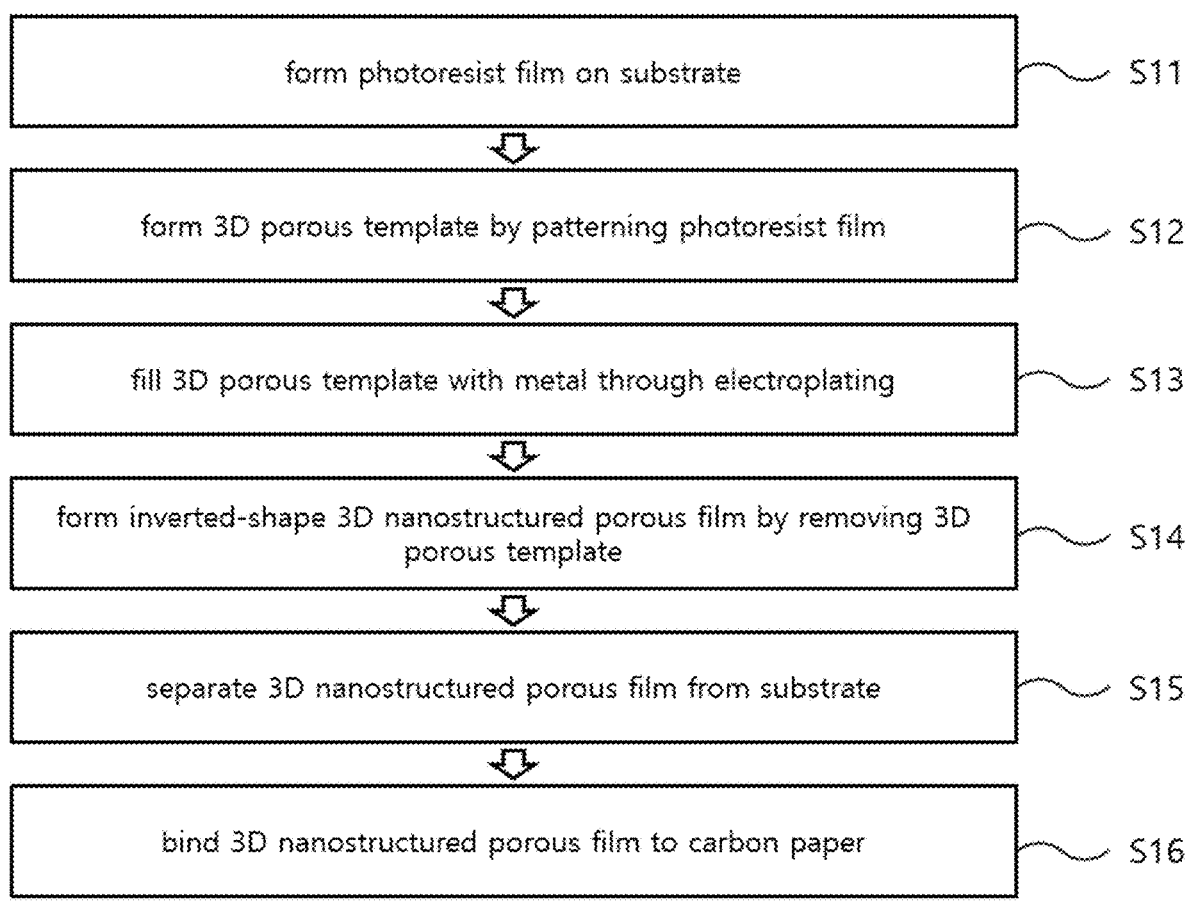
FIG. 1 is a flowchart illustrating a method for manufacturing a porous electrode according to an embodiment of the disclosure.

FIG. 1 is a flowchart illustrating a method for manufacturing a porous electrode according to an embodiment of the disclosure.

Figure 2:
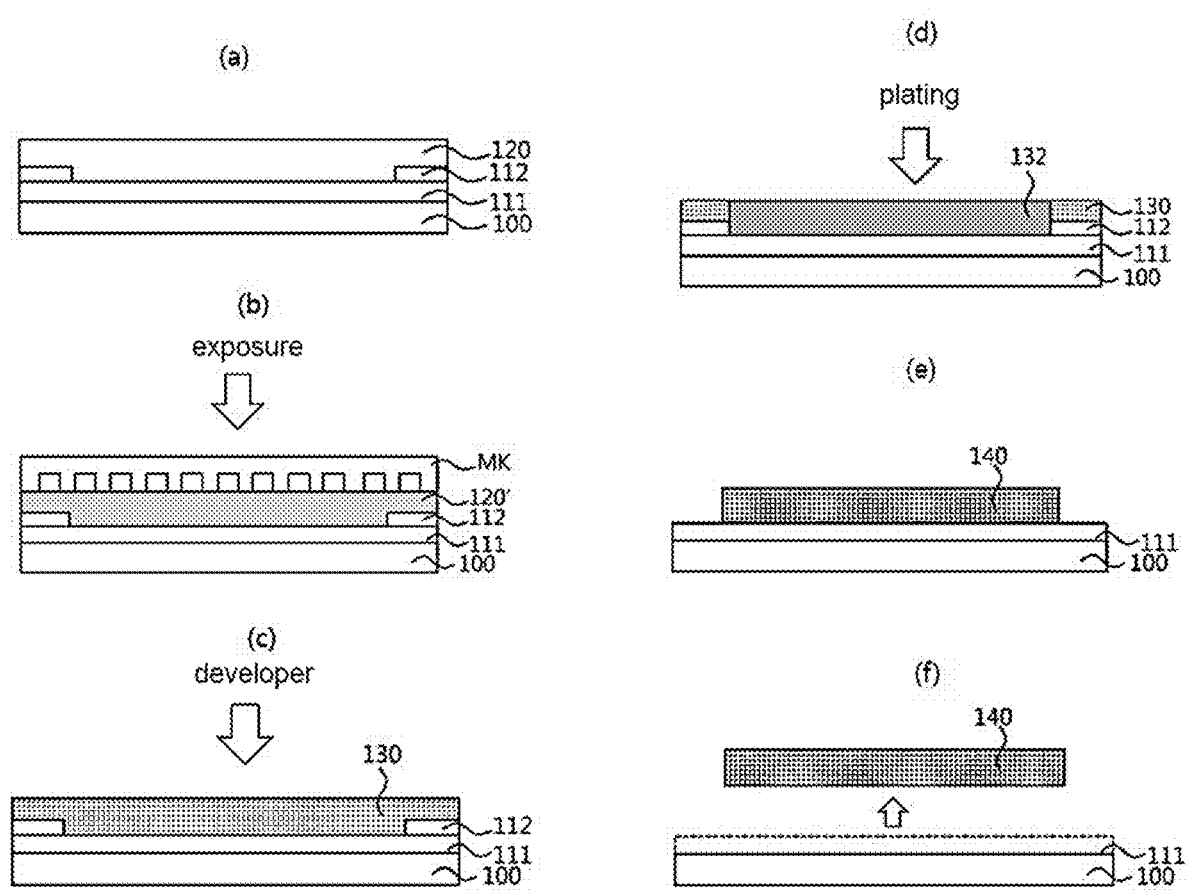
FIG. 2 is a cross-sectional view illustrating a method for manufacturing a catalyst film of a porous electrode according to an embodiment of the disclosure.

FIG. 2 is a cross-sectional view illustrating a method for manufacturing a catalyst film of a porous electrode according to an embodiment of the disclosure.

Figure 3:
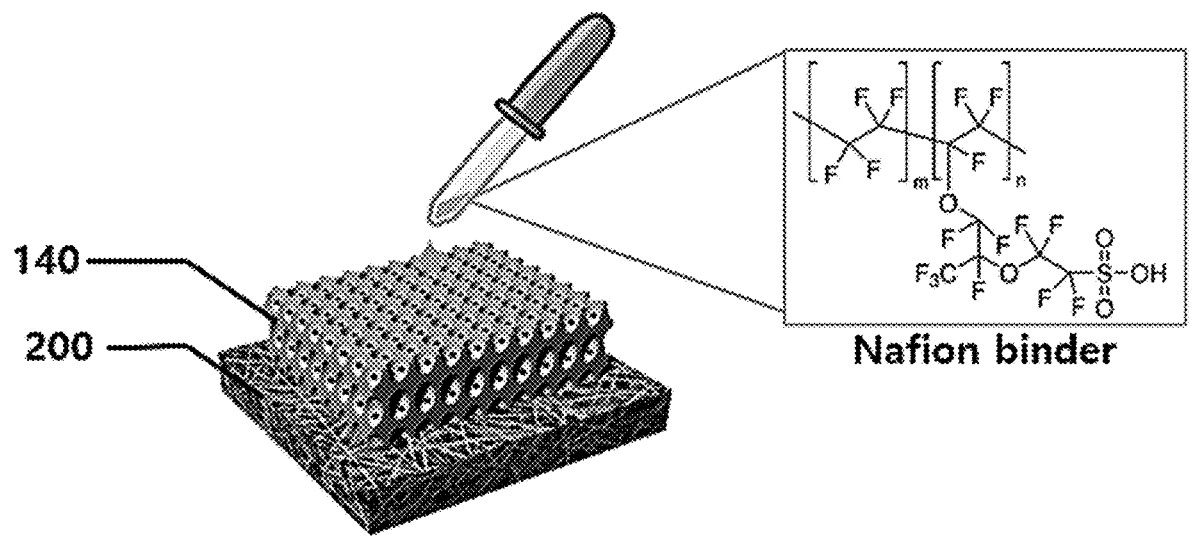
FIG. 3 is a illustrating process for combining a catalyst film and carbon paper in a method for manufacturing a porous electrode according to an embodiment of the disclosure.

FIG. 3 is a view illustrating a process for combining a catalyst film and carbon paper in a method for manufacturing a porous air electrode according to an embodiment of the disclosure.

Referring to FIGS. 1 and 2, a photoresist film is formed on a substrate (S11). Referring to FIG. 2(a), the substrate may include a conductive layer 111 disposed on a base substrate 100.

An adhesive film 112 is formed on the conductive layer 111.

For example, the adhesive film 112 may include an opening area.

A photoresist film 120 is formed on the adhesive film 112 and the conductive layer 111.

According to an embodiment, the base substrate 100 may include a non-conductive material, such as glass, silicon, or quartz.

The conductive layer 111 may include a metal.

However, embodiments of the disclosure are not limited thereto, and the substrate may have conductivity as a whole.

The conductive layer 111 is preferably formed of a material that may be easily removed while maintaining the chemical and physical properties of a three-dimensional nanostructured porous film to be formed later.

For example, the conductive layer 111 may include titanium.

Further, depending on the components of the conductive layer 111, the conductive layer 111 preferably has a thickness of 10 nm to 100 nm or more so as to have sufficiently high electrical conductivity for electroplating.

The adhesive film 112 may be formed of a photoresist material.

For example, a first photoresist material may be coated on the substrate through a spin coating process.

A preliminary heat treatment may be performed on the applied first photoresist material, e.g., at a temperature ranging from about 90° C. to about 100° C. (so called "soft baking").

Next, after masking the area which is to be opened, exposure and development are performed using, e.g., ultraviolet (UV) light, removing the non-exposed area and forming the opening.

Next, hard baking is performed using a hot plate at a temperature ranging from about 100° C. to about 250° C., forming the adhesive film 112.

The photoresist film 120 may fill the opened area, and contact to the conductive layer 111.

For example, after a second photoresist material is coated on the exposed upper surfaces of the adhesive film 112 and the conductive layer 111 through a spin coating process, soft baking is performed, e.g., at a temperature ranging from about 90° C. to about 100° C., forming the photoresist film 120.

The same or different types of photoresist materials may be used as the first photoresist material and the second photoresist material to form the adhesive film 110 and the photoresist film 120.

According to an embodiment, an epoxy-based negative-tone photoresist or a DNQ-based positive-tone photoresist may be used as the first photoresist material and the second photoresist material.

In an embodiment, as the first photoresist material and the second photoresist material, an organic-inorganic hybrid material having photo-crosslinking properties, a hydrogel, a phenolic resin, or the like may be used.

According to an embodiment, the adhesive film 112 may be formed to a thickness of about 0.5 µm to about 5 µm.

The photoresist film 120 may be formed to have a thickness of about 0.3 µm to 1 mm, preferably 1 µm to 100 µm.

Referring to FIG. 1 and (b) and (c) of FIG. 2, the photoresist film 120 is subjected to exposure and development, forming a three-dimensional porous template 130 (S12). According to an embodiment, three-dimensional distributed light is projected to the photoresist film 120.

The three-dimensional light diffraction pattern may be formed through proximity-field nanopatterning (PnP).

In the PnP method, e.g., a periodic three-dimensional light pattern generated from interference of the light transmitted through a phase mask (MK) composed of an elastomer material is used to be patterned a polymer material, such as a photoresist.

For example, if a flexible and elastomeric phase mask (MK) having a protrusion-depression (grating) lattice structure formed on its surface is brought into contact with the photoresist film, the phase mask may naturally adhere (e.g., conformal contact) to the surface of the photoresist film based on a Van der Waals force.

When laser having a wavelength in a range similar to the grating period of the phase mask is irradiated onto the surface of the phase mask MK, a three-dimensional distribution of light may be formed by the Talbot effect.

If a negative-tone photoresist is used, crosslinking of the photoresist selectively occurs only in the portion where light is strong due to constructive interference, and portions where light is relatively weak may be removed during development due to insufficient exposure dose for crosslinking.

Finally, by undergoing a drying process, a porous polymer structure in which periodic three-dimensional structures of several hundred nanometers (nm) to several micrometers (µm) depending on the wavelength of the laser and the design of the phase mask are networked may be formed.

According to an embodiment, the pore size and periodicity of the porous polymer structure may be controlled (or adjusted) by adjusting (or controlling) the wavelength of incident light and the pattern period of the phase mask used in the PnP method.

More details of the PnP method are disclosed in the paper J. Phys. Chem. B 2007, 111, 12945-12958; Proc. Natl. Acad. Sci. U.S.A. 2004, 101, 12428; Adv. Mater. 2004, 16, 1369 or Korean Patent Application Publication No. 2006-0109477 published on Oct. 20, 2006, which are incorporated by reference herein in their entireties.

In some embodiments, the phase mask used in the PnP method may include polydimethyl siloxane (PDMS), polyurethane acrylate (PUA), or perfluoropolyether (PFPE).

According to an embodiment, when the photoresist film 120 is formed of a negative-tone photoresist, the non-exposed portion may be removed by the developer and the exposed portion may remain.

Accordingly, a three-dimensional porous template 130 including three-dimensional nanopores may be obtained.

As the developer, e.g., propylene glycol monomethyl ether acetate (PGMEA) may be used.

For example, the three-dimensional porous template 130 may include channels in which nanoscale pores in a range of about 1 nm to about 2,000 nm are three-dimensionally interconnected or partially connected with each other.

Accordingly, the three-dimensional porous template 130 may include a three-dimensional network structure having a periodic distribution by the channels.

Referring to FIG. 1 and FIG. 2(d), the three-dimensional porous template 130 is filled with a conductive material, forming a composite 132 (S13). For example, the conductive material may be provided by plating, such as electroplating or electroless plating. According to an embodiment, the conductive material may be provided by electroplating.

However, embodiments of the disclosure are not limited thereto, and other various methods known to fill the porous structure, such as a solution process and vapor deposition, may be used.

In the electroplating, an electrolytic cell including a positive electrode, an electrolyte solution, and a negative electrode may be used, and the conductive layer 111 under the three-dimensional porous template 130 may be provided as the negative electrode.

The electrolyte solution may include a conductive material, e.g., cations of a metal, and may move the metal cations included in the electrolyte solution toward the three-dimensional porous template 130 by supplying a predetermined voltage through a power source.

For example, the electrolyte solution may vary depending on the material group to fill the porous template through electroplating, and may include, e.g., $H_2PtCl_6$, copper sulfate, copper chloride, nickel chloride, $CoSO_4$, $PdCl_2$, $RuCl_3$, or $KAu(CN)_2$.

According to an embodiment, in the electroplating, the conductive layer 111 of the substrate is used as the negative electrode.

Accordingly, the conductive material may fill an area where the adhesive film 112 is not disposed.

In an embodiment, the surface of the three-dimensional porous template 130 may be plasma-treated before performing the electroplating.

Accordingly, the surface of the three-dimensional porous template 130 may be changed from hydrophobicity to hydrophilicity, and the accessibility of the metal cations in the electrolyte solution may be enhanced.

When the electroplating is performed, the filling rate of the conductive material may be controlled (or adjusted) by adjusting (or controlling) the magnitude of the voltage and/or the current and the supply time.

Referring to FIG. 1 and FIG. 2(e), the three-dimensional porous template is removed to form a three-dimensional nanostructured porous film 140 (S14). According to an embodiment, the three-dimensional nanostructured porous film 140 may include copper.

However, embodiments of the disclosure are not limited thereto, and other transition metals, noble metals, oxides, nitrides and sulfides may be used.

The three-dimensional nanostructured porous film 140 includes at least one of a group of catalysts of an oxygen reduction reaction (ORR) and an oxygen evolution reaction (OER) reaction that occur in the air electrode.

For example, the three-dimensional nanostructured porous film 140 may include copper, nickel, manganese, cobalt, palladium, platinum, a transition metal oxide, or a combination thereof.

For example, the transition metal oxide may include manganese dioxide, cerium dioxide, and the like.

Further, the pore size of the three-dimensional nanostructured porous film 140 may be in a range of 10 nm to 1 µm, as suitable for the air electrode.

The three-dimensional nanostructured porous film 140 may be manufactured through a method capable of filling with a suitable material depending on the application of the electrode.

For example, it is possible to obtain a three-dimensional nanostructured porous film including a conductive carbon material, such as graphene or carbon nanotubes, a conductive metal oxide, etc. using a solution process, deposition, or the like rather than plating.

According to an embodiment, the three-dimensional porous template may be removed through heat treatment, wet etching, or oxygen plasma treatment.

The heat treatment may be performed at a temperature of about 400° C. to about 1,000° C., and may be carried out, e.g., in an air or oxygen atmosphere.

An inert gas, such as argon (Ar), may be added to the atmosphere for the heat treatment.

The plasma treatment may include an oxygen plasma treatment or a reactive ion etching (RIE) process.

The three-dimensional nanostructured porous film 140 may have an inverted shape of the three-dimensional porous template.

Accordingly, the three-dimensional nanostructured porous film 140 may have a porous structure including pores connected in three dimension.

Referring to FIG. 1 and FIG. 2(f), the three-dimensional nanostructured porous film 140 is separated from the substrate (S15). According to an embodiment, after plasma etching, the conductive layer 111 of the substrate 100 may be removed.

The conductive layer 111 contacts the three-dimensional nanostructured porous film 140.

When the substrate coupled with the three-dimensional nanostructured porous film 140 is immersed in an etchant, such as hydrofluoric acid, hydrochloric acid, nitric acid or potassium hydroxide solution, the conductive layer 111 may be dissolved so that the substrate and the three-dimensional nanostructured porous film 140 may be separated from each other.

Therefore, a three-dimensional nanostructured porous film 140 with openings in both the upper and lower surfaces may be obtained.

Accordingly, when the three-dimensional nanostructured porous film 140 is used as, e.g., an air electrode, electrolyte and air may be easily provided therein.

For example, the solution for dissolving the conductive layer 111 may contain 5% to 20% (wt. %) of hydrofluoric acid.

For example, the three-dimensional nanostructured porous film 140 is immersed in a hydrofluoric acid solution diluted to 10% for 10 minutes to 1 hour or longer, removing the conductive layer 111.

The three-dimensional nanostructured porous film 140 separated from the substrate is rinsed in distilled water two or more times, and then sufficiently dried.

Titanium may be selectively removed while minimizing damage to the metal layer in a hydrofluoric acid (HF) solution in addition to acids that dissolve most metal materials, such as hydrochloric acid, sulfuric acid, and nitric acid. Thus, titanium may be a suitable material as a conductive sacrificial layer required in the disclosure.

In the disclosure, the etching solution and the conductive layer 111 are not limited to hydrofluoric acid and titanium, and other appropriate materials may be selected so as not to damage the three-dimensional nanostructured porous film 140.

According to an embodiment of the disclosure, to further enhance the performance of the lithium-air battery, a surface activation process may be performed before separating the three-dimensional nanostructured porous film 140 from the substrate.

For example, the surface activation process may include electropolishing and hydrofluoric acid-treating the three-dimensional nanostructured porous film 140.

Thus, impurities (e.g., oxides) on the surface of the three-dimensional nanostructured porous film 140 may be removed and the surface may be activated.

According to an embodiment, the electropolishing step may be performed in 50 cycles or less, e.g., for 10 to 30 cycles.

As an example, one cycle may include an on state (10 mA/cm$^2$) in which a current flows for 5 seconds and an off state (0 mA/cm$^2$) in which no current flow is maintained for 5 seconds.

If the electropolishing step is excessively performed, excessive etching may be performed, deforming the pore structure.

Further, hydrofluoric acid treatment may be performed by immersion in hydrofluoric acid.

According to an embodiment, the three-dimensional nanostructured porous film 140 may be immersed in a 10% diluted hydrofluoric acid solution for 5 hours or less, e.g., for 30 minutes to 5 hours.

When the hydrofluoric acid immersion time is excessive, it is difficult to control the etching rate, so that reproducibility may be degraded and the pore structure may be deformed. If only hydrofluoric acid treatment is performed without electropolishing, the oxide film may remain.

The hydrofluoric acid treatment may be performed simultaneously with the step of separating the substrate.

For example, after performing electropolishing before separating the three-dimensional nanostructured porous film 140 from the substrate, the surface activation process and the substrate separation process may be simultaneously performed through hydrofluoric acid treatment.

Referring to FIGS. 1 and 3, the three-dimensional nanostructured porous film 140 and a porous current collector 200 are bonded (S16). For example, the porous current collector 200 may have a carbon-based porous structure.

According to an embodiment, the porous current collector 200 may be carbon paper.

However, embodiments of the disclosure are not limited thereto, and the porous current collector 200 may include a metal mesh or meta foam, such as of nickel, stainless steel, copper, gold, silver, or aluminum, or a combination thereof.

According to an embodiment, it is preferable that the carbon paper has excellent electrical conductivity and is open on two opposite sides thereof.

For example, the carbon paper may have a combined structure of carbon wires, carbon plates, carbon particles, or a combination thereof, and may have a total thickness of 200 μm to 300 μm.

The size of the pores of the carbon paper may be in a range of several tens of nm to several μm, and the pore structure, arrangement and thickness are not limited.

According to an embodiment, after placing the carbon paper on a hot plate heated to 50° C. to 90° C., the three-dimensional nano-structured porous film 140 is brought into contact with the top of the carbon paper.

The planar size of the carbon paper may be the same as or larger than the planar size of the three-dimensional nanostructured porous film 140.

For example, drying may be performed while dripping a diluted binder solution from above the three-dimensional nanostructured porous film 140.

The binder solution may move to the interface between the three-dimensional nanostructured porous film 140 and the porous current collector 200 through the pores of the three-dimensional nanostructured porous film 140 and may be dried to attach the three-dimensional nanostructured porous film 140 and the porous current collector 200.

According to an embodiment, the binder solution may include a fluorine-based binder polymer, such as Nafion, PVDF-HFP (polyvinylidene fluoride-hexafluoropropylene), PTFE (polytetrafluoroethylene), or the like, and it may use an organic solvent, such as isopropyl alcohol and ethanol, as a solution for dilution.

The dilution concentration and the amount used may vary depending on the type of binder and dilution solution used and need to be controlled so as not to block the pore network in the three-dimensional nanostructured porous film 140 and not to block the connection channels of the interface between the three-dimensional nanostructured porous film 140 and the porous current collector 200.

Further, the temperature and heating time of the hot plate may be adjusted to sufficiently dry the solvent of the binder.

When the binder content of the binder solution is excessive, the electrical conductivity of the electrode may decrease, thereby lowering the energy efficiency of the electrode. When the binder content is too small, detachment of the carbon paper and the three-dimensional nanostructured porous film may occur or the mechanical stability of the electrode may be degraded.

The fluorine-based binder polymer is advantageous for forming a low-viscosity solution and, in a small amount, may bond the three-dimensional nanostructured porous film 140 and the porous current collector 200.

In this case, as optimization variables of the binder dropping process, the binder content and the drying process temperature may be set, which may lead to a difference in performance of the air electrode.

According to an embodiment, the content of the binder polymer in the binder solution may be 0.1 wt. % to 5 wt. %, preferably 2 wt. % to 3 wt. %.

When the content of the binder polymer is too small, it is difficult to form a stable bond, and an electrical short circuit and degradation of lifespan properties may occur due to the detachment of the three-dimensional nanostructured porous film 140 and the porous current collector 200.

Further, when the content of the binder polymer is excessive, energy efficiency may decrease as the resistance of the electrode increases.

According to an embodiment, after the binder solution is dripped, a drying process may be performed.

For example, the drying temperature may be 50° C. to 150° C., and the drying atmosphere may include an air or a vacuum atmosphere.

A three-dimensional nanostructured porous electrode including a three-dimensional nanostructured catalyst film combined with a porous current collecting layer (carbon paper) according to an embodiment of the disclosure may be used as an electrode of a lithium-air battery.

The three-dimensional nanostructured porous electrode provides efficient movement of electrons, ions, and air between the porous current collecting layer and the three-dimensional nanostructured catalyst film when the air electrode is driven.

Accordingly, the efficiency of the lithium-air battery may be enhanced.

The three-dimensional nanostructured porous electrode is composed of three-dimensionally arranged units, so that the material and properties may be easily digital twined.

Accordingly, it is possible to discover performance effective factors that may directly or indirectly affect device performance.

Digital twin technology may mean a replication technique of representing a real physical object and system to a virtual digital world.

For example, a three-dimensional nanostructured porous electrode including an interconnected pore network is formed into a three-dimensional structure through digital twinning.

To form the three-dimensional nanostructured porous electrode in three dimension, a voxel assembly program may be used and, based thereupon, various interpretations or analysis, such as of the area and length of the reaction interface, and changes in electron density, which may not be interpreted with one- or two-dimensional analysis, are possible.

Figure 4:
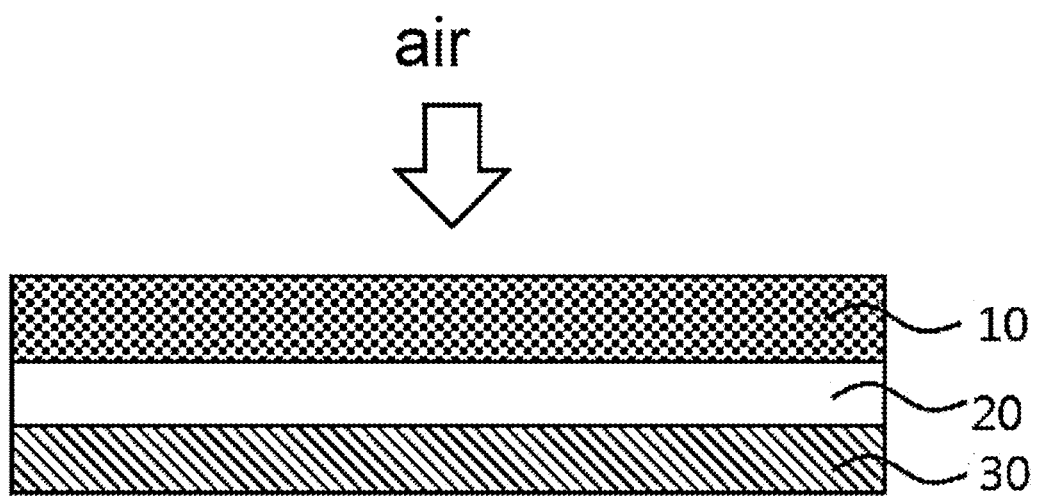
FIG. 4 is a cross-sectional view illustrating a lithium-air battery according to an embodiment of the disclosure.

FIG. 4 is a cross-sectional view illustrating a lithium-air battery according to an embodiment of the disclosure.

Referring to FIG. 4, a lithium-air battery includes a porous positive electrode 10 having three-dimensional pores, a separator 20, a negative electrode 30 containing lithium, and an electrolyte.

The electrolyte may be impregnated into the positive electrode 10, the negative electrode 30, and the separator 20.

The porous positive electrode 10 having the three-dimensional pores may be the same as the above-described three-dimensional nanostructured porous electrode.

For example, the three-dimensional nanostructured porous electrode may include a three-dimensional nanostructured porous catalyst film coupled to a porous current collecting layer by a binder resin.

The three-dimensional nanostructured porous catalyst film may face the electrolyte layer 30 or the separator 20.

For example, air may be transferred to the three-dimensional nanostructured porous catalyst film through the porous current collecting layer.

For example, the separator is a non-conductive material having pores capable of movement of lithium ions, and may be formed of cellulose, glass fiber, polymer, or the like.

For example, the electrolyte may include a combination of a lithium salt, such as $LiCF_3SO_3$, $LiN(CF_3SO_2)_2$, $LiClO_4$, $LiNO_3$, etc., and an organic solvent, such as dimethyl ether (DME), dimethyl sulfoxide (DMSO), tetraethyleneglycol dimethyl ether (TEGDME), diethylene glycol dimethyl ether (DEGDME), etc.

Further, the electrolyte may include a solid electrolyte, such as pervoskite.

The separator 20 may prevent an electrical short circuit between the positive electrode and the negative electrode.

For example, the separator 20 may be formed of, but is not limited to, a porous polymer film formed of a polyolefin-based polymer, such as an ethylene homopolymer, a propylene homopolymer, an ethylene/butene copolymer, an ethylene/hexene copolymer, and an ethylene/methacrylate copolymer, or a stack of such porous polymer films, or a nonwoven fabric formed of high-melting-point glass fiber or polyethylene terephthalate fiber.

According to an embodiment, the electrolyte may be formed of a tetraethyleneglycol dimethylether (TEGDME) non-aqueous electrolyte in which 1M $LiCF_3SO_3$ salt is dissolved, and the separator may be formed of glass fiber.

The negative electrode 30 may include lithium, a lithium alloy, a lithium-metal oxide, a lithium-metal nitride, or a combination thereof.

For example, the lithium alloy may include a lithium-aluminum alloy, a lithium-tin alloy, a lithium-lead alloy, a lithium-silicon alloy, or a combination thereof.

The lithium-metal oxide may include lithium-titanium oxide or the like.

The lithium-metal nitride may include lithium-cobalt nitride, lithium-iron nitride, lithium-manganese nitride, or the like.

According to embodiments of the disclosure, the lithium-air battery has a smooth inflow of air and movement of electrons.

Accordingly, the efficiency of the lithium-air battery may be enhanced.

Hereinafter, an example of manufacturing, and performance of, a three-dimensional nanostructured porous electrode and a lithium-air battery including the three-dimensional nanostructured porous electrode according to embodiments are described in more detail through specific experimental examples.

The experimental examples are provided by way of example only, and the scope of the disclosure is not limited thereto.

Embodiment 1: Preparation of Air Electrode in which Three-Dimensional Nanostructured Porous Film and Carbon Paper are Bonded Preparation of Polymer-Based Three-Dimensional Porous Template Using Proximity-Field Nanopatterning Technology A photoresist (commercially available in the trade name of SU-8 2, from Micro Chem) was spin-coated on a $SiO_2$/Si substrate, on which 100 nm of Ti was deposited, at 3,000 rpm for 30 seconds and was then heated on a hot plate at 65° C. for 2 minutes and at 95° C. for 3 minutes.

Next, a chromium mask was placed thereon and was exposed to an ultraviolet (UV) lamp of 365 nm wavelength for 1 minute and heated to 95° C. for 3 minutes to thereby crosslink the photoresist in the area except for the opening area.

Next, an adhesive film was formed by forming a two-dimensional pattern through a developing process.

Next, a photoresist (SU-8 10) was spin-coated on the substrate, on which the adhesive film was formed, at 1,400 rpm for 30 seconds and then heated on a hot plate at 65° C. and 95° C.

A phase mask formed of a PDMS material having a periodic rectangular arrangement of protrusion-depression structures was brought into contact with the photoresist-coated substrate.

The phase mask was irradiated with Nd:YAG laser with a wavelength of 355 nm at about 10-10.5 mJ to obtain a three-dimensional porous template having a periodic arrangement in the x, y, and z axes and having a thickness of about 9-10 μm.

2. Formation of Porous Nanostructures Through Electroplating

The three-dimensional porous template was filled with copper to a certain height by electroplating.

An electroplating bath was composed of 0.15 M copper sulfate and 0.5 M sulfuric acid, and a copper plate was used as the counter electrode.

Electroplating was performed up to a thickness of about 8 μm, using pulse plating that periodically applies a current density of −10 mA/cm$^2$ so as to fill the porous polymer template containing a network of pores with a size of 200-300 nm without leaving an empty space.

Thereafter, a three-dimensional porous copper nanostructure having an inverted shape was obtained by removing the three-dimensional polymer template through a plasma etching device using a gas of $O_2$, $N_2$, or $CF_4$.

3. Obtaining a Three-Dimensional Nanostructured Porous Film Through Ti Layer Removal For surface activation of the three-dimensional porous copper nanostructure obtained on the Ti substrate, electropolishing (hereinafter referred to as EP) was performed.

A total of 20 cycles was performed, each cycle of which including applying a current of +10 mA/cm$^2$ to the three-dimensional porous copper nanostructure for 5 seconds (which is referred to as an "on state") and resting for 5 seconds (which is referred to as an "off state").

Further, for surface activation and separation from the substrate, the three-dimensional porous copper nanostructure was immersed in a hydrofluoric acid solution diluted to 10% for 1 hour.

In the hydrofluoric acid solution, the copper nanostructure was obtained as a porous film with both the top and the bottom open due to the removal of the Ti layer without any change in the pore network.

The obtained three-dimensional nanostructured porous film was washed twice or more in distilled water and then dried.

4. Manufacture of Air Electrode Through Combination of Three-Dimensional Nanostructured Porous Film and Carbon Paper Nafion solution (5 wt. % binder concentration) and isopropyl alcohol (IPA) were mixed in a volume ratio of 1:1 to prepare a binder solution.

After placing carbon paper on a hot plate preheated to 80° C., the three-dimensional nanostructured porous film was placed thereon.

The mixed Nafion diluted solution was dropwise dropped, at about 67 μL/cm$^2$, on the upper portion of the three-dimensional nanostructured porous film on the carbon paper, and then dried (80° C.) on a hot plate for 15-20 minutes, forming a three-dimensional nanostructured porous electrode.

5. Preparation of Lithium-Air Battery Including Three-Dimensional Air Electrode

To construct a Swagelok type lithium-air battery, a lithium metal negative electrode, a separator, and an electrolyte were placed from the bottom, and the three-dimensional nanostructured porous catalyst film was placed on the electrolyte to face the lithium metal negative electrode (embodiment 1). Therefore, the lower end of the carbon paper was positioned at the top of the lithium-air battery and was connected with an air insertion portion.

All of the electrodes were cut into disks with a diameter of 1.2 cm, and 1M $LiCF_3SO_3$ in TEGDME was used as the electrolyte.

Comparative Examples

As a comparative example, after bonding or coating commercial copper foam (c-Cu Foam) and commercial copper nanoparticles (c-Cu NPs) on a carbon paper current collector, the lithium-air batteries of comparative examples 1 and 2 were prepared in the same manner as in embodiment 1.

Figure 5:
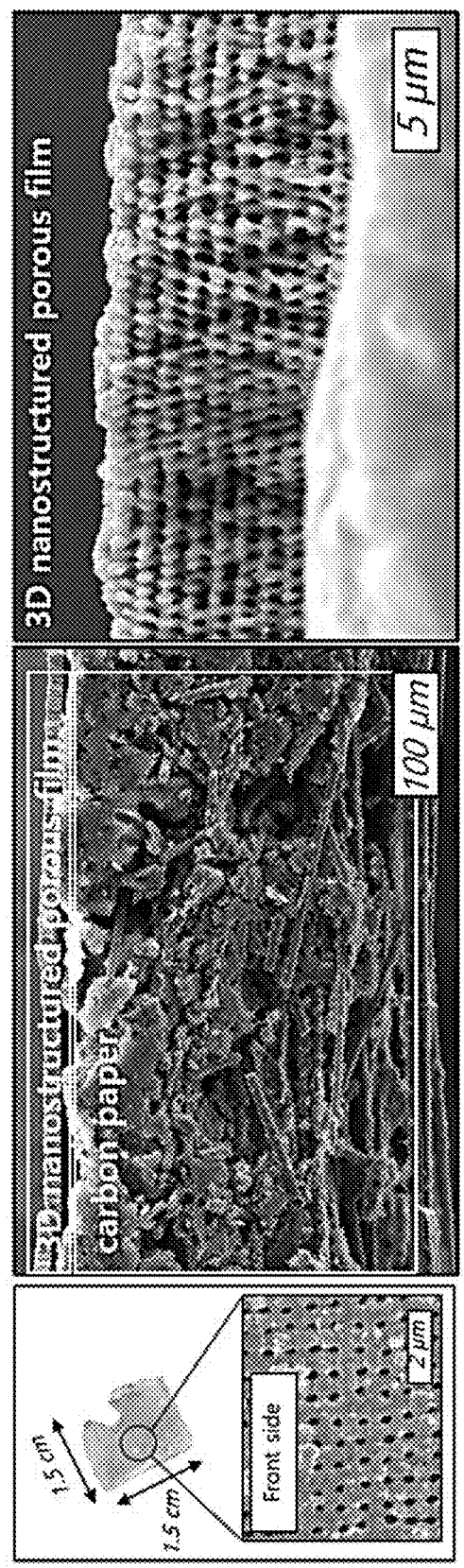
FIG. 5 is a scanning electron microscopy (SEM) image of a combination of a three-dimensional nanostructured porous film of embodiment 1 and carbon paper.

FIG. 5 is a scanning electron microscopy (SEM) image of a combination of a three-dimensional nanostructured porous film of embodiment 1 and carbon paper.

Referring to FIG. 5, it may be identified that a three-dimensional nanostructured porous film having an aligned pore structure is attached onto carbon paper through embodiment 1.

Figure 6:
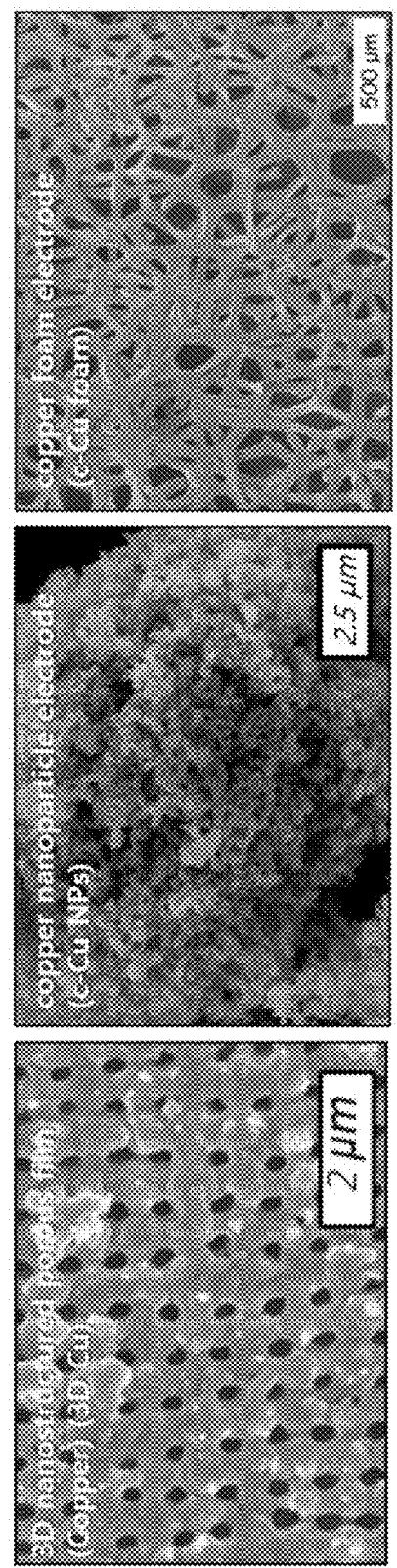
FIG. 6 is SEM images of porous catalyst films of embodiment 1 (3D-Cu), comparative example 1 (c-Cu Foam), and comparative example 2 (c-Cu NPs)

FIG. 6 is SEM images of porous catalyst films of embodiment 1 (3D-Cu), comparative example 1 (c-Cu Foam), and comparative example 2 (c-Cu NPs).

Referring to FIG. 6, it may be identified that the three-dimensional nanostructured porous catalyst film obtained through embodiment 1 has aligned pores.

Figure 7A:
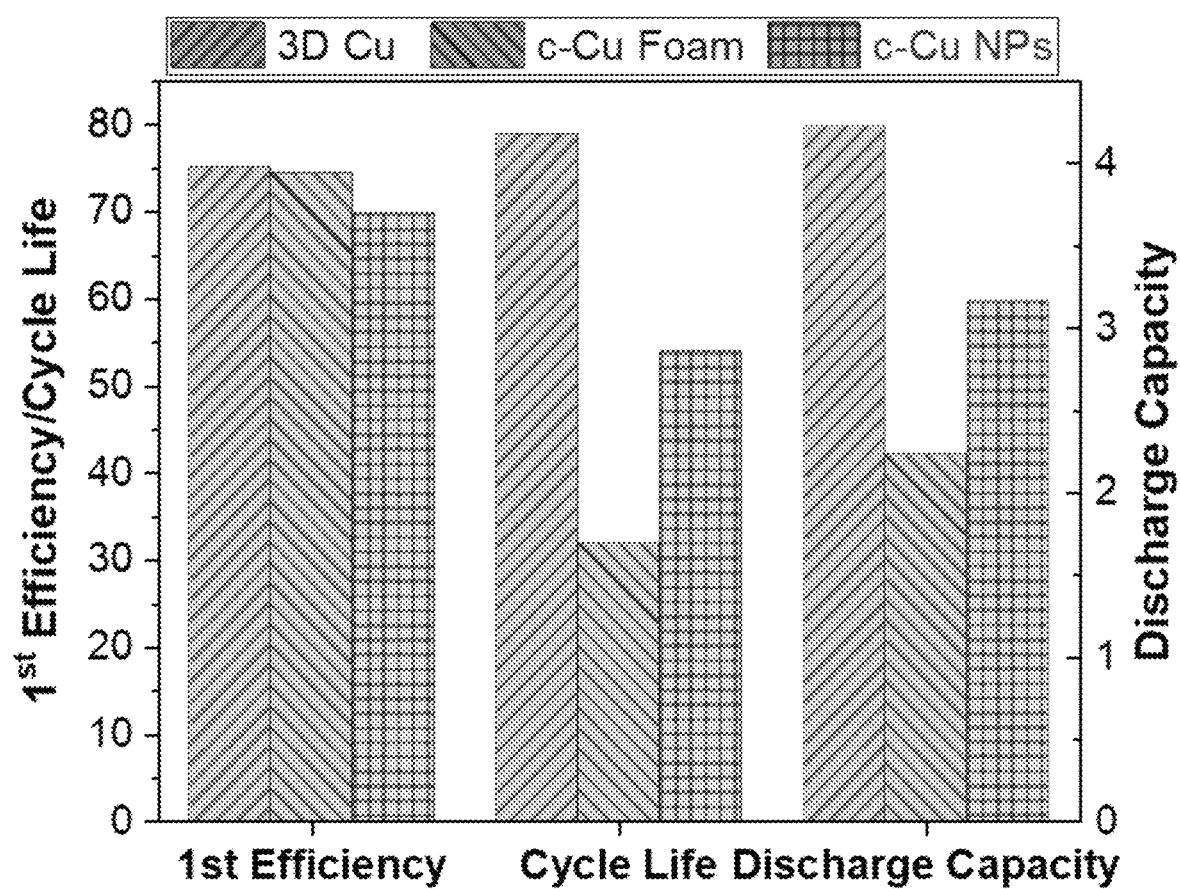
FIGS. 7A and 7B are graphs illustrating the results of performance evaluation of air electrodes of embodiment 1 (3D-Cu), comparative example 1 (c-Cu Foam), and comparative example 2 (c-Cu NPs)
Figure 7B:
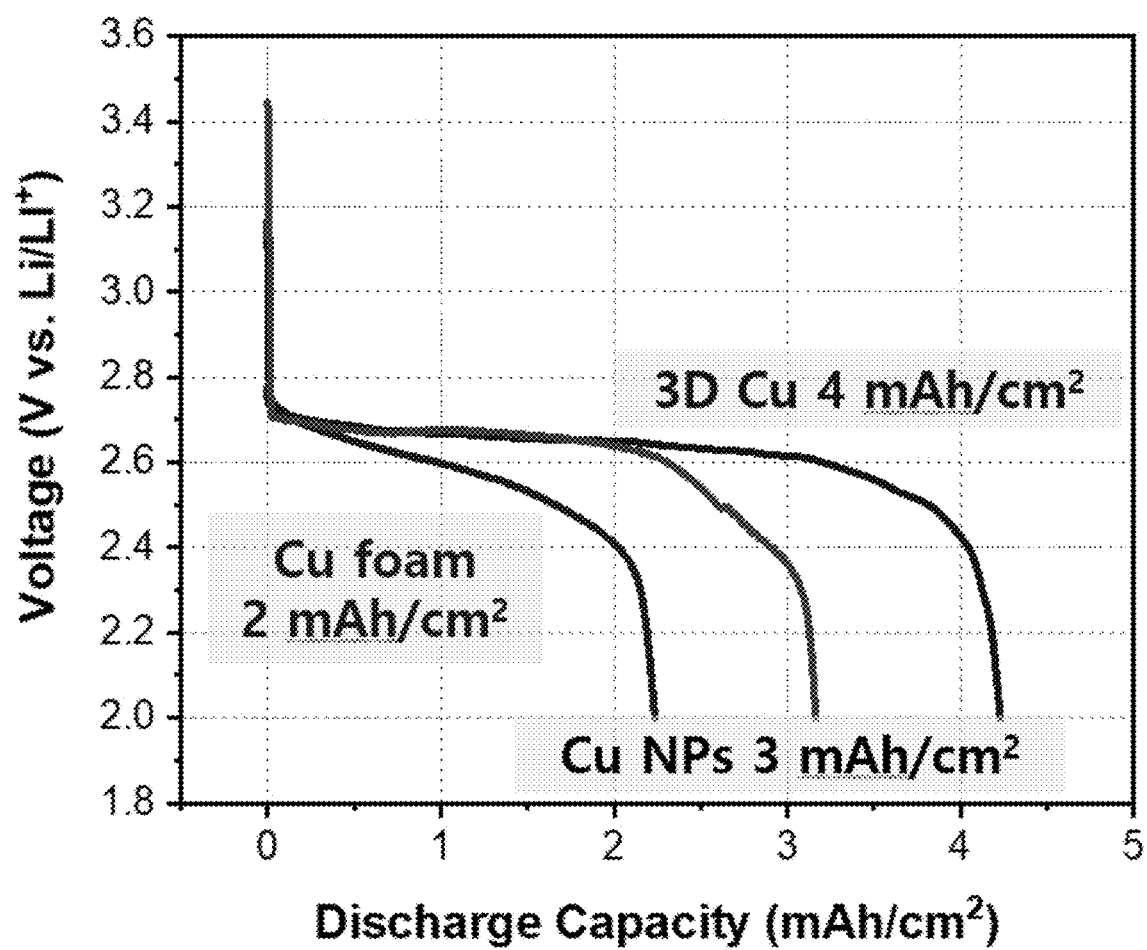

FIGS. 7A and 7B are graphs illustrating the results of performance evaluation of air electrodes of embodiment 1 (3D-Cu), comparative example 1 (c-Cu Foam), and comparative example 2 (c-Cu NPs).

FIG. 7A is a graph illustrating energy efficiency vs. cycle properties obtained by measuring the properties of a battery with a current density of 0.05 mA/cm$^2$ at a limited charge/discharge capacity of 0.25 mAh/cm$^2$, and FIG. 7B is a graph illustrating the properties of the maximum discharge capacity per unit area measured with a current density of 0.05 mA/cm$^2$ in 2.0 V to 4.5 V.

Referring to FIG. 7, it may be identified that according to the embodiment of the disclosure, it is possible to obtain a lithium-air battery having higher energy efficiency and a larger maximum discharge capacity per unit area.

Figure 8:
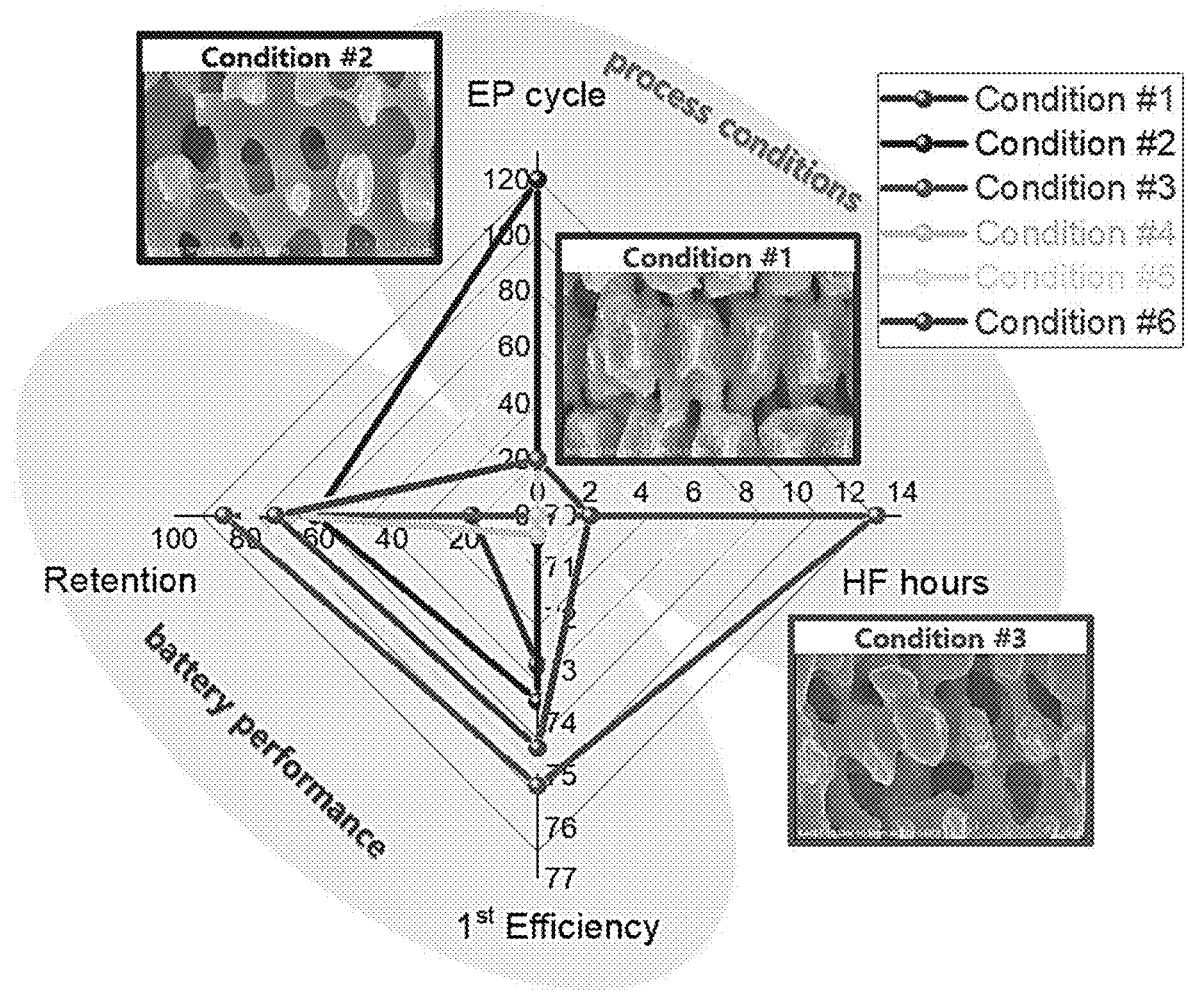
FIG. 8 is a graph illustrating the results of measuring the initial energy efficiency (first energy efficiency) and retention under different conditions in a surface activation step.

FIG. 8 is a graph illustrating the results of measuring the initial energy efficiency (first energy efficiency) and retention under different conditions in a surface activation step.

The experiment of FIG. 8 was performed under the same conditions as in the previous experiment.

Referring to FIG. 8, it may be identified that sample 5 corresponding to embodiment 1 of the disclosure and sample 6 having similar conditions exhibit better results superior to those of samples 2 and 4 in which only electropolishing was performed. It may also be identified that the reproducibility is significantly lowered when the hydrofluoric acid treatment is excessively performed (sample 3).

TABLE 1

|  | Sample 1 (condition 1) | Sample 2 (condition 2) | Sample 3 (condition 3) | Sample 4 (condition 4) | Sample 5 (condition 5) | Sample 6 (condition 6) |
|---|---|---|---|---|---|---|
| Number of electropolishing cycles | — | 120 | — | 20 | 20 | 20 |
| Immersion time in hydrofluoric acid (hours) | — | — | 13 | — | 1 | 3.5 |

Figure 9:
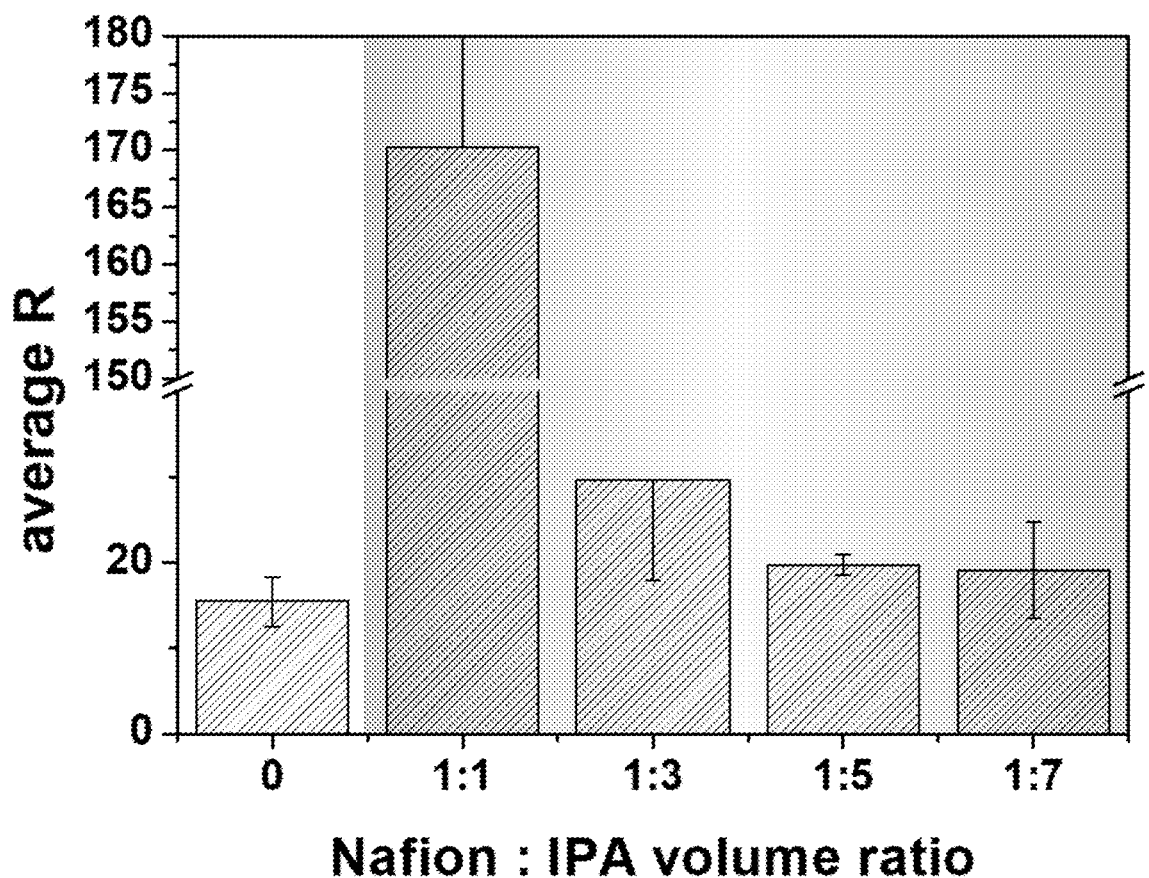
FIG. 9 is a graph illustrating the result of measuring the resistance of the electrode while varying the concentration ratio of the binder solution.

FIG. 9 is a graph illustrating the result of measuring the resistance of the electrode while varying the concentration ratio of the binder solution.

Referring to FIG. 9, it may be identified that the resistance of the electrode increases as the concentration of the binder in the binder solution increases.

Figure 10A:
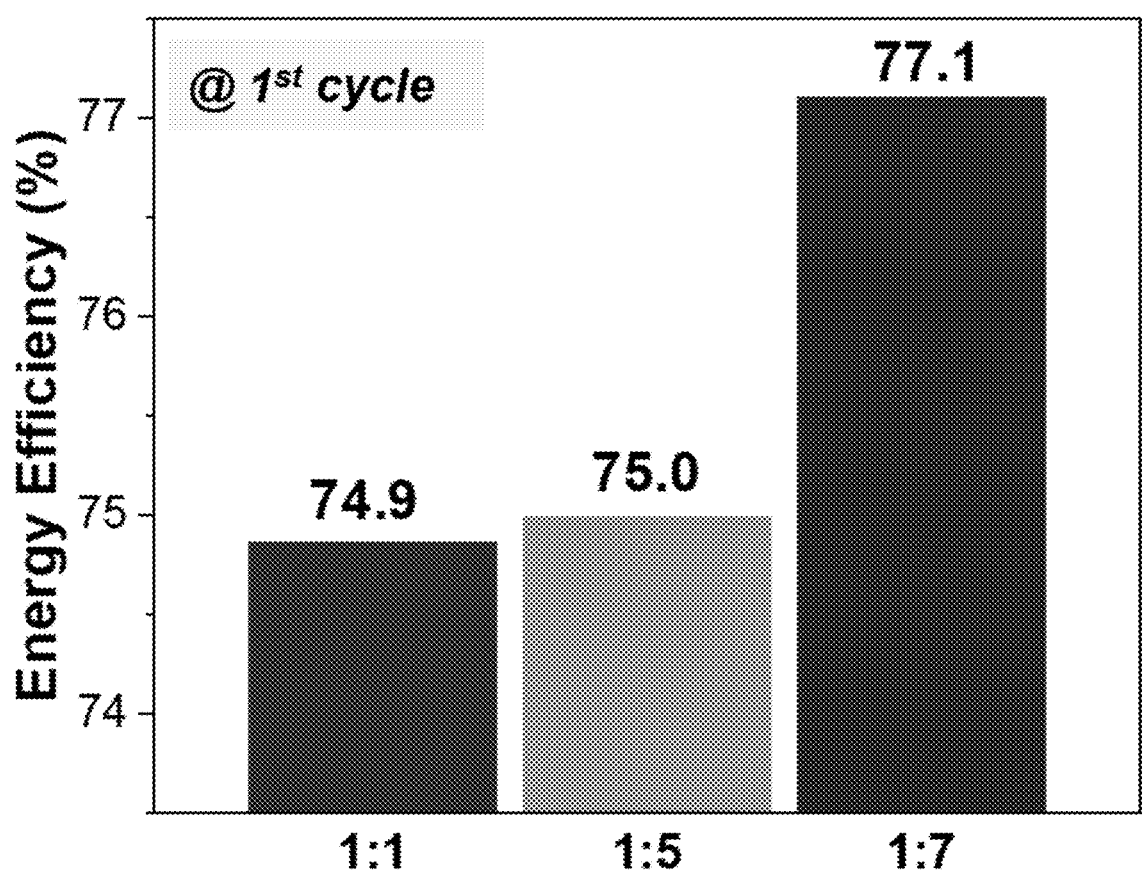
FIGS. 10A and 10B are graphs illustrating the results of measuring the initial energy efficiency after a first charge/discharge cycle and the energy efficiency according to the cycle while varying the concentration of the binder solution.
Figure 10B:
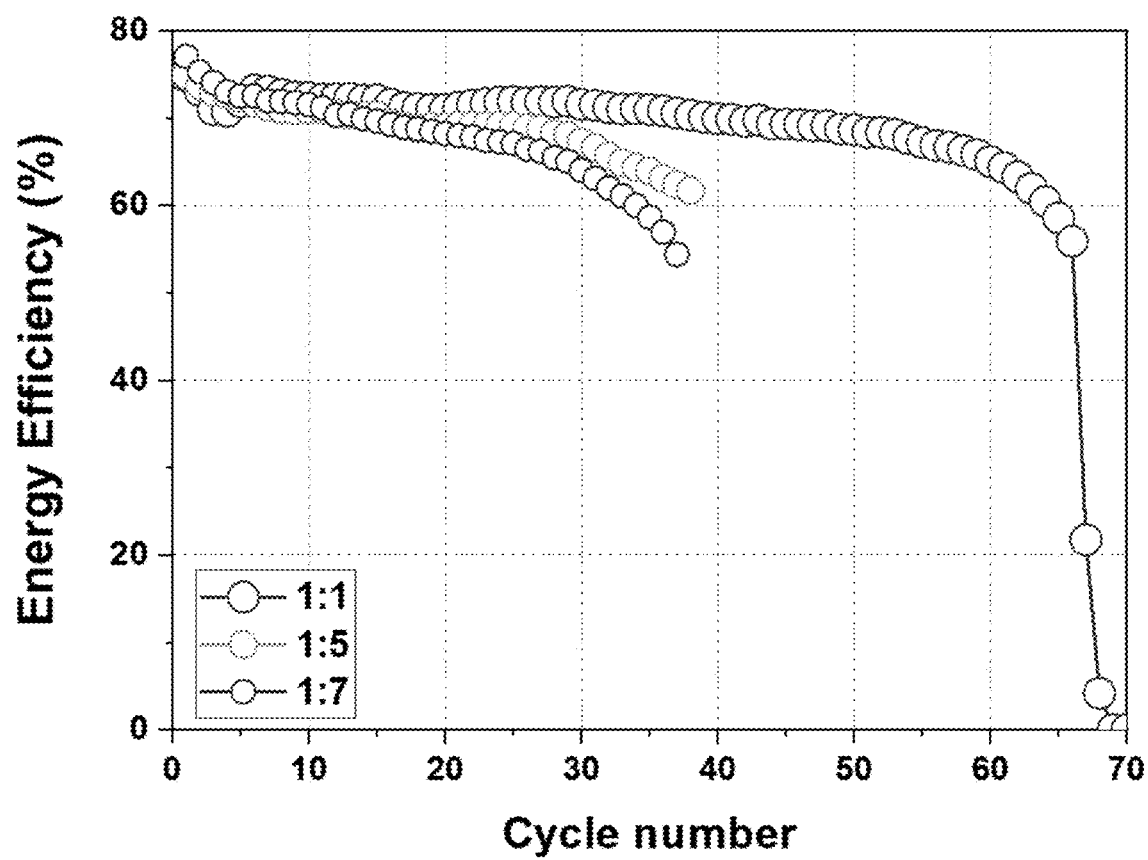

FIGS. 10A and 10B are graphs illustrating the results of measuring energy efficiency while varying the concentration of the binder solution.

The experiments of FIGS. 10A and 10B were performed under the same conditions as in the previous experiment.

Referring to FIG. 10A, the initial energy efficiency is better in the condition of a lower binder concentration (1:7), and it may be inferred that this is due to the decrease in the resistance of the electrode.

However, referring to FIG. 10B, the energy efficiency when charge/discharge is performed is much higher in embodiment 1 (1:1) with a high binder concentration. Thus, it may be identified that given the long-term lifespan properties, it is preferable that the binder concentration is high than a certain level Digital Twin Simulation FIG. 11 is a view illustrating the result of performing digital twinning to perform static finite element or volume analysis of the air electrodes of embodiment 1 (3D-Cu), comparative example 1 (c-Cu Foam), and comparative example 2 (c-Cu NPs).

Figure 11:
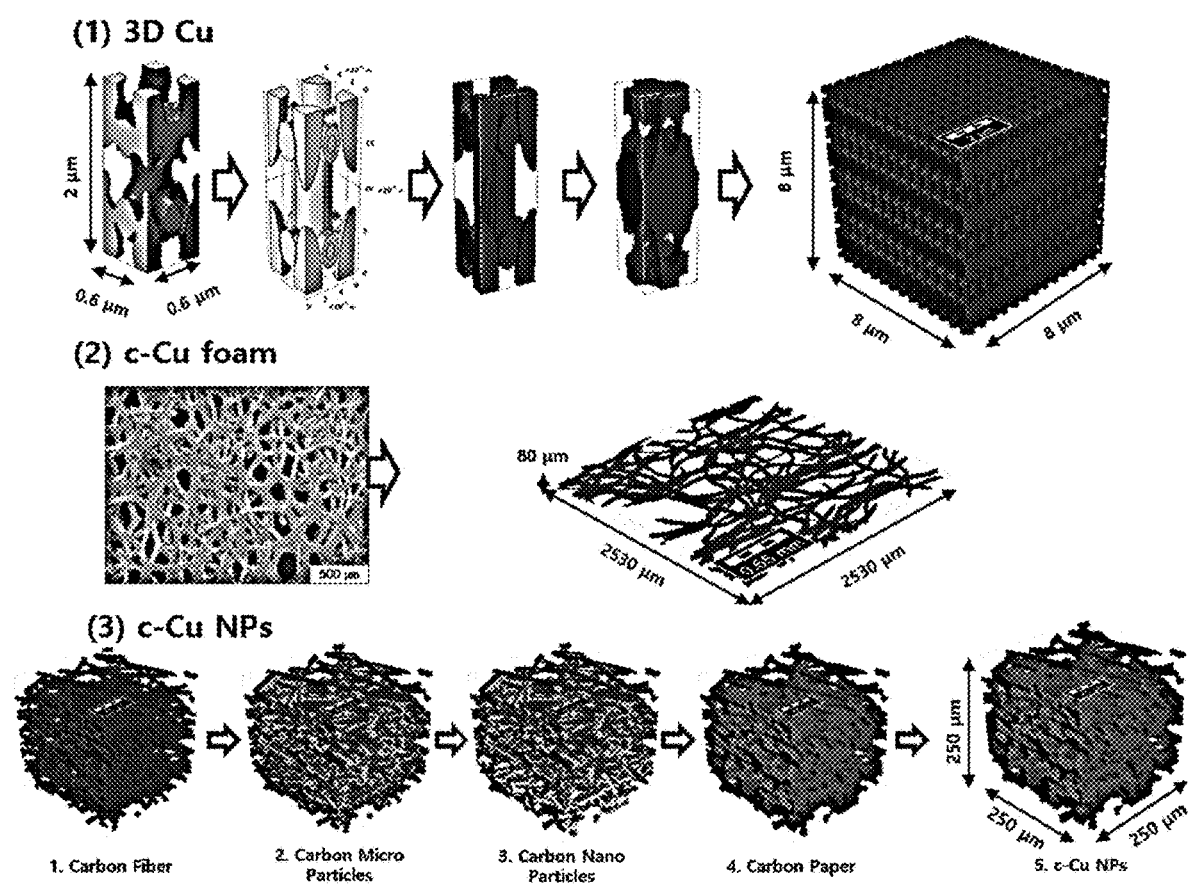
FIG. 11 is a view illustrating the result of performing digital twinning to perform static finite element or volume analysis of the air electrodes of embodiment 1 (3D-Cu), comparative example 1 (c-Cu Foam), and comparative example 2 (c-Cu NPs)
Figure 12A:
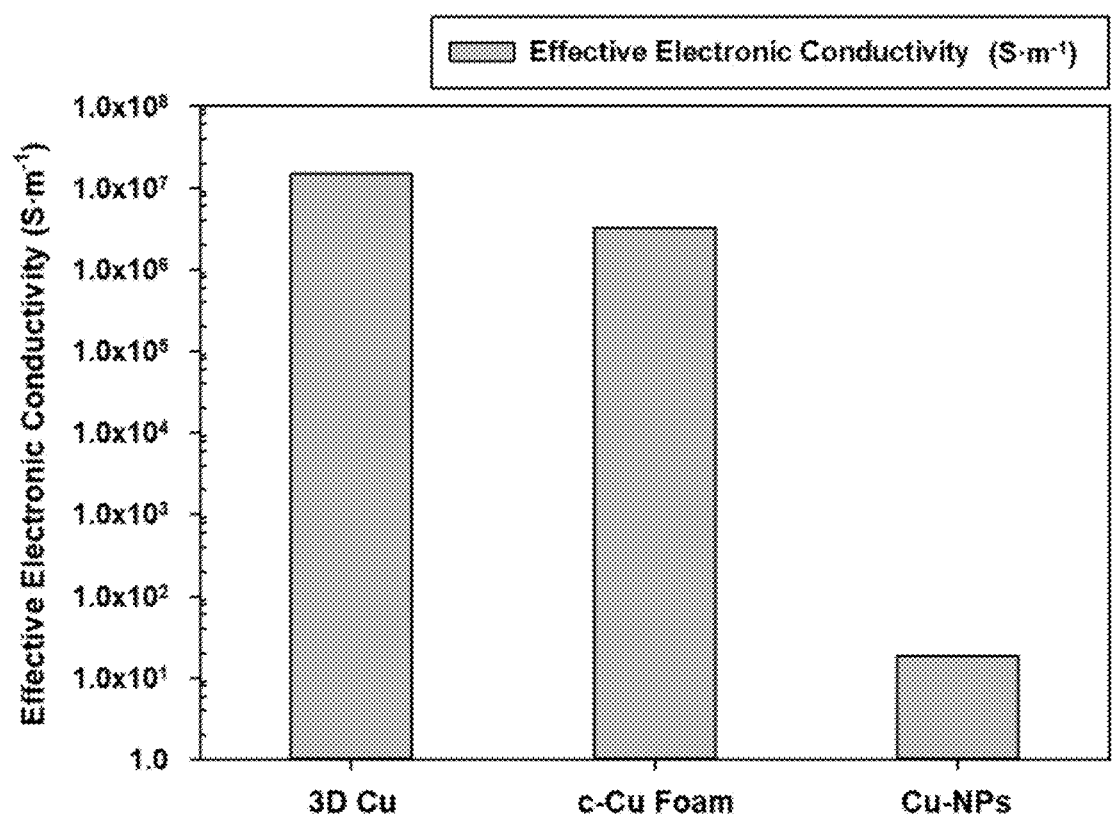
FIGS. 12A, 12B, 12C, 12D, and 12E are graphs illustrating performance factors in the lithium-air battery of the air electrodes of embodiment 1 (3D-Cu), comparative example 1 (c-Cu Foam), and comparative example 2 (c-Cu NPs), e.g., effective electronic conductivity, effective ionic conductivity, effective diffusion coefficient of oxygen ($O_2$ effective diffusivity), the area of the 2-phase interface (2-phase contact area) where lithium ions/oxygen (liquid) dissolved in electrolyte are adjacent to electrons (solid electrode), the length of the 3-phase interface (3-phase contact line) where lithium ions (liquid), electrons (solid), and oxygen (gas) are all adjacent to each other, and the results of correcting the 2-phase contact area and the 3-phase contact line with their respective correction constants (e.g., the Cu volume in each domain or the area of each domain), based on the result of digital twinning of FIG. 11.
Figure 12B:
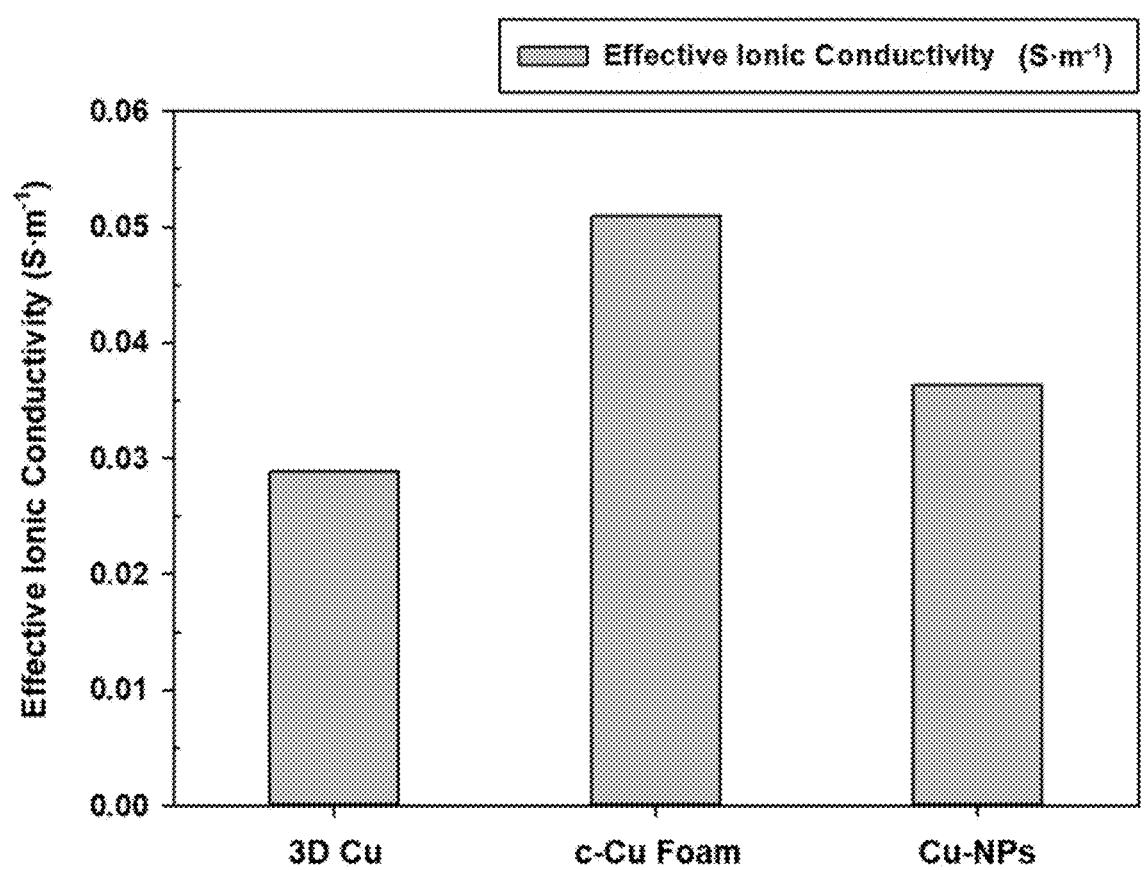
Figure 12C:
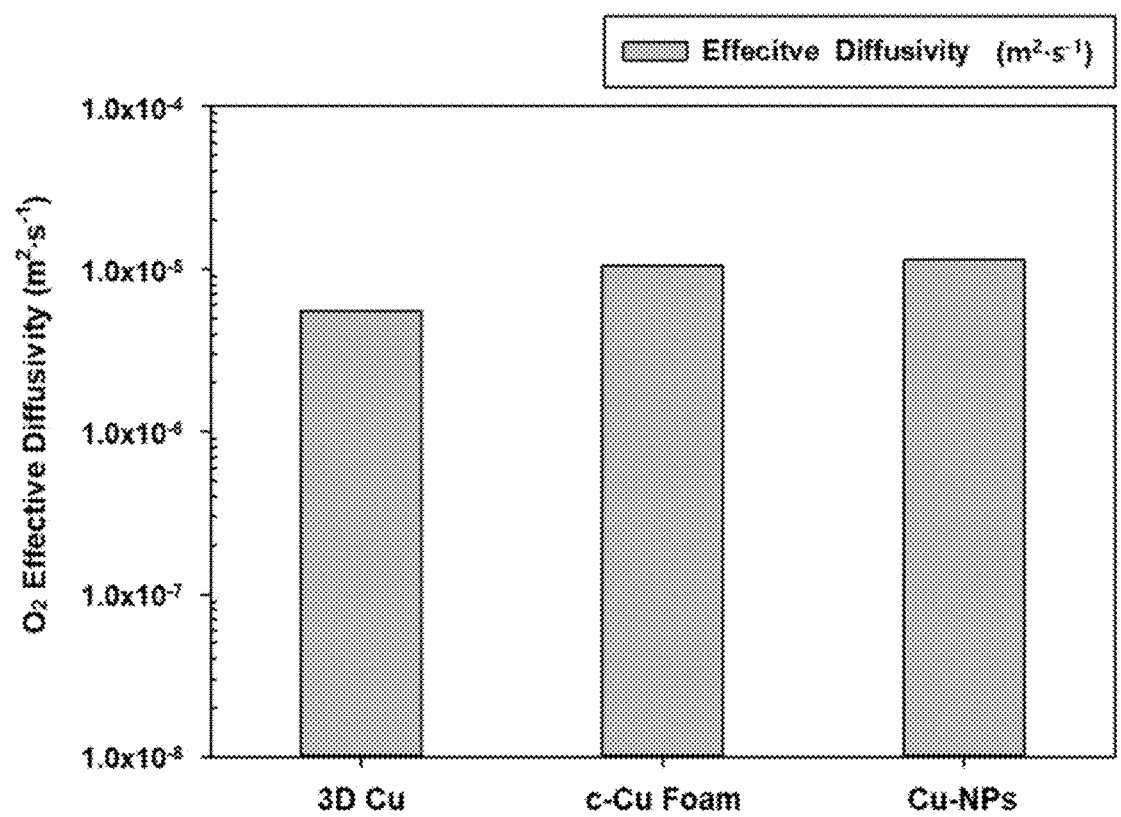
Figure 12D:
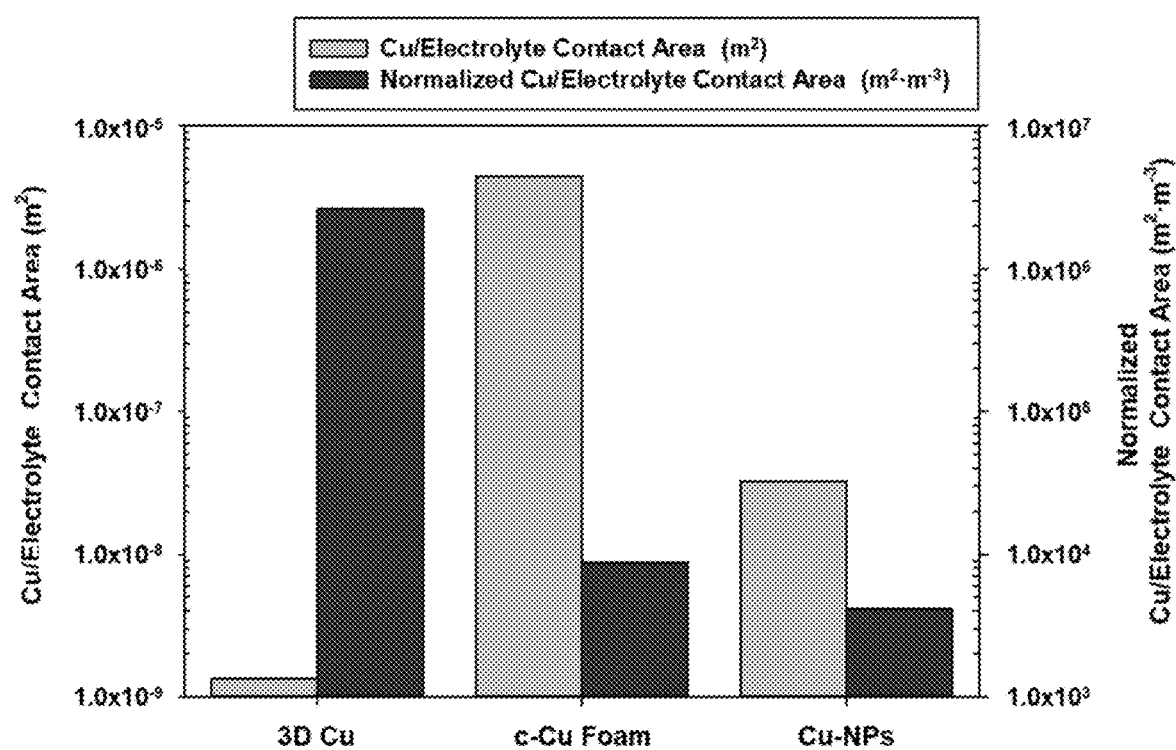
Figure 12E:
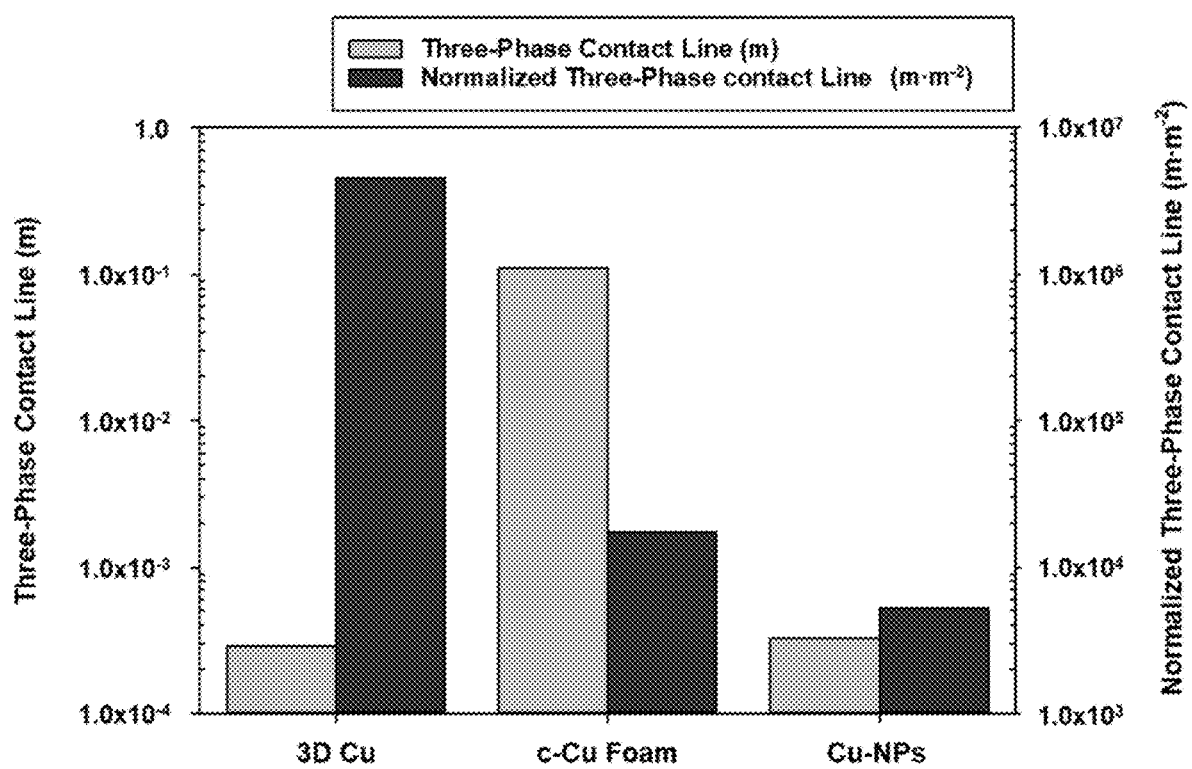

FIGS. 12A, 12B, 12C, 12D, and 12E are graphs illustrating performance factors in the lithium-air battery of the air electrodes of embodiment 1 (3D-Cu), comparative example 1 (c-Cu Foam), and comparative example 2 (c-Cu NPs), e.g., effective electronic conductivity, effective ionic conductivity, effective diffusion coefficient of oxygen ($O_2$ effective diffusivity), the area of the 2-phase interface (2-phase contact area) where lithium ions/oxygen (liquid) dissolved in electrolyte are adjacent to electrons (solid electrode), the length of the 3-phase interface (3-phase contact line) where lithium ions (liquid), electrons (solid), and oxygen (gas) are all adjacent to each other, and the results of correcting the 2-phase contact area and the 3-phase contact line with their respective corresponding correction constants (e.g., the Cu volume in each domain or the area of each domain), based on the result of digital twinning of FIG. 11.

Based on the three-dimensional porous template, a COMSOL digital twin unit cell structure was transferred to GeoDict to obtain an inverted shape of the structure.

Then, after setting the size of the analysis domain to 8 μm in all axial directions, the inverted-shape unit cell structure was repeatedly arranged in the domain.

The filling rate of the unit cell in the set analysis domain was 44% (i.e., the porosity was 56%), which reflected the design factor of the three-dimensional porous copper nanostructure, as it is.

After establishing the above digital twin process, a specific voxel size was selected according to the morphological properties according to the three-dimensional porous copper nanostructure properties, and the voxel size of 10 nm was set, and analysis was performed.

Thus, simulation was performed, using GeoDict-ConductoDict, DiffuDict, and PoroDict, on key factors directly or indirectly affecting the performance of the air electrode, such as effective electronic conductivity, effective ionic conductivity, effective $O_2$ diffusivity, the area of the 2-phase interface (electrolyte/copper; liquid containining dissolved oxygen and lithium ions and copper providing electrons), the length of the 3-phase interface (electrolyte/air/copper).

Thus, it may be identified and analyzed that the excellent performance is obtained by the three-dimensional nanostructured porous electrode obtained through embodiment 1, and it may be expected that such an analysis tool may be usefully available for predicting the performance of other similar configurations.

According to various embodiments of the disclosure, the three-dimensional nanostructured porous electrode may be used as an electrode material for various energy storage devices, and may be used in various metal-air batteries, zinc-air batteries, or other various metal-air batteries, which require enhancement of oxygen reduction/evolution kinetics and increase of reaction interface.

Although the disclosure has been shown and described with reference to embodiments thereto, it will be appreciated by one of ordinary skill in the art that various changes or modifications may be made thereto without departing from the scope of the disclosure.

What is claimed is:

1. A porous electrode, comprising:
a three-dimensional nanostructured porous catalyst film including a catalyst material promoting an oxygen reduction and an evolution reaction, and having an aligned pore structure with a porous upper surface and a porous lower surface; and
a porous current collecting layer interfacially adhered to the three-dimensional nanostructured porous catalyst film by a binder polymer, wherein the porous current collecting layer includes carbon paper including at least one of a carbon wire, a carbon plate, and carbon particles.

2. The porous electrode of claim 1, wherein the catalyst material includes at least one selected from the group consisting of copper, nickel, manganese, cobalt, palladium, platinum, and a transition metal oxide.

3. The porous electrode of claim 1, wherein the binder polymer includes a fluorine-based polymer.

4. The porous electrode of claim 1, wherein the binder polymer includes at least one selected from the group consisting of Nafion, PVDF-HFP (polyvinylidene fluoride-hexafluoropropylene), and PTFE (polytetrafluoroethylene).

5. The porous electrode of claim 1, wherein the porous current collecting layer includes at least one selected from the group consisting of a metal mesh and a metal foam.

6. A metal-air battery, comprising:
- a positive electrode including the porous electrode of claim 1;
- a negative electrode spaced apart from the positive electrode and including lithium;
- a separator disposed between the positive electrode and the negative electrode; and
- an electrolyte for transferring ions between the positive electrode and the negative electrode.

7. A method for manufacturing a porous electrode, the method comprising:
- forming a three-dimensional porous template on a substrate including a conductive layer;
- filling the three-dimensional porous template through electroplating;
- removing the three-dimensional porous template to form an inverted-shape three-dimensional nanostructured porous film;
- removing the conductive layer to separate the three-dimensional nanostructured porous film from the substrate;
- bringing a porous current collecting layer and the three-dimensional nanostructured porous film in contact with each other;
- dropping a binder solution including a binder polymer on the three-dimensional nanostructured porous film; and
- drying the binder solution to bind the porous current collecting layer and the three-dimensional nanostructured porous film, wherein the porous current collecting layer includes carbon paper.

8. The method of claim 7, wherein the three-dimensional nanostructured porous film includes a catalyst material promoting an oxygen reduction and evolution reactions.

9. The method of claim 7, wherein the binder polymer includes a fluorine-based polymer.

10. The method for claim 9, wherein a content of the binder polymer is 0.1 wt. % to 5 wt. % with respect to 100 wt. % of the binder solution.

11. The method of claim 7, wherein the binder polymer includes at least one selected from the group consisting of Nafion, PVDF-HFP (polyvinylidene fluoride-hexafluoropropylene), and PTFE (polytetrafluoroethylene).

12. The method of claim 7, wherein the carbon paper includes at least one of a carbon wire, a carbon plate, and carbon particles.

13. The method of claim 7, wherein the porous current collecting layer includes at least one selected from the group consisting of a metal mesh and a metal foam.

14. The method of claim 7, further comprising performing electropolishing to activate a surface of the three-dimensional nanostructured porous film, before separating the three-dimensional nanostructured porous film from the substrate.

15. The method of claim 14, further comprising immersing the three-dimensional nanostructured porous film combined with the substrate in hydrofluoric acid to separate the three-dimensional nanostructured porous film from the substrate and activate the surface of the three-dimensional nanostructured porous film.

* * * * *